(12) United States Patent
Biller et al.

(10) Patent No.: US 6,186,431 B1
(45) Date of Patent: Feb. 13, 2001

(54) BELT RETRACTOR FOR A VEHICULAR SEAT BELT SYSTEM

(75) Inventors: Joachim Biller, Lorch; Wolfgang Holbein, Alfdorf, both of (DE)

(73) Assignee: TRW Occupant Restraint Systems GmbH & Co. KG, Alfdorf (DE)

( * ) Notice: Under 35 U.S.C. 154(b), the term of this patent shall be extended for 0 days.

(21) Appl. No.: 09/271,660

(22) Filed: Mar. 17, 1999

(30) Foreign Application Priority Data

Mar. 20, 1998 (DE) .......................................... 298 05 084 U

(51) Int. Cl.[7] .......................... B65H 75/48; B60R 22/36; B60R 22/34
(52) U.S. Cl. ........................ 242/374; 280/806; 280/807; 297/475; 297/478
(58) Field of Search ............................ 242/374; 280/806, 280/807; 297/475, 478

(56) References Cited

U.S. PATENT DOCUMENTS 5,967,440 * 10/1999 Marchall .............................. 242/374

* cited by examiner

*Primary Examiner*—John Q. Nguyen
(74) *Attorney, Agent, or Firm*—Tarolli, Sundheim, Covell, Tummino &Szabo L.L.P.

(57) ABSTRACT

A belt retractor for a vehicular seat belt system comprises a belt reel taking up a seat belt, a belt tensioning mechanism capable of biasing the belt reel in a winding direction of the seat-belt, and a sensor capable of triggering the belt tensioning mechanism and provided with a safety device translatable by installation of the belt retractor in a vehicle from a secured condition in which the sensor is blocked, into a released condition in which the sensor is ready to trigger. The safety device includes a sensor blocking element which is movable between a blocking position in which the sensor is blocked, and a release position in which the sensor is ready to trigger, and includes a transport locking element and a sensing element. The sensing element senses a diameter of a coil of the seat belt on the belt reel and allows a movement of the sensor blocking element into the release position only when the diameter is below a predetermined value. The transport locking element is movable between a locked position and a release position. A spring is provided which biases the transport locking element into the release position, and a spring is provided which biases the sensor blocking element into the release position. The transport locking element comprises a retaining section which in the locked position engages an arresting section of the sensor blocking element and maintains it in the blocking position.

11 Claims, 24 Drawing Sheets

BELT RETRACTOR FOR A VEHICULAR SEAT BELT SYSTEM

TECHNICAL FIELD

The invention relates to a belt retractor for a vehicular seat belt system.

BACKGROUND OF THE INVENTION

A belt retractor as is known for example from European patent application 0 456 853 comprises a belt reel taking up the seat belt, a belt tensioning mechanism capable of biasing the belt reel in the winding direction of the seat belt, and a sensor capable of triggering the belt tensioning mechanism and is provided with a safety device translatable by installation of the belt retractor in a vehicle from a secured condition, in which the sensor is blocked, into a released condition in which the sensor is ready to trigger, the safety device including a sensor blocking element which is movable between a blocking position in which the sensor is blocked and a release position in which the sensor is ready to trigger.

A belt tensioning mechanism being triggered by a sensor when required serves to eliminate belt slack from the seat belt system by rotating the belt reel in the winding direction of the seat belt so that a vehicle occupant is involved in the deceleration of the vehicle as early as possible. To prevent triggering of the belt tensioning mechanism during transport of the belt retractor prior to it being mounted in the vehicle, a sensor blocking element is provided which in its blocking position blocks an inertial mass of the sensor. The sensor blocking element is shifted into its release position when the belt retractor is installed in the vehicle. This may be done, for example, by means of a sensing pin which on installation of the belt retractor comes into contact with a part of the vehicle and is urged into the housing of the belt retractor.

The disadvantage in this known belt retractor is that no possibility is provided to prevent an activation of the belt tensioning mechanism when the seat belt is not in use at all. So if the vehicle is involved in an accident, the belt tensioning mechanism is actuated even when, for example, the belt retractor concerned is provided for the front-passenger seat and the front-passenger seat is unoccupied.

The object of the invention is to provide a belt retractor of the aforementioned kind in which a transport safeguarding device, preventing activation of the belt tensioning mechanism when the belt retractor is not incorporated in a vehicle, is combined in a simple way with an occupancy sensor, preventing a triggering of the belt tensioning mechanism when the seat belt of the belt retractor is not in use.

SUMMARY OF THE INVENTION

The invention provides belt retractor for a vehicular seat belt system, comprising a belt reel taking up a seat belt, a belt tensioning mechanism capable of biasing the belt reel in a winding direction of the seat-belt, and a sensor capable of triggering the belt tensioning mechanism and provided with a safety device translatable by installation of the belt retractor in a vehicle from a secured condition in which the sensor is blocked, into a released condition in which the sensor is ready to trigger. The safety device includes a sensor blocking element which is movable between a blocking position in which the sensor is blocked, and a release position in which the sensor is ready to trigger, and includes a transport locking element and a sensing element. The sensing element senses a diameter of a coil of the seat belt on the belt reel and allows a movement of the sensor blocking element into the release position only when the diameter is below a predetermined value. The transport locking element is movable between a locked position and a release position. A spring is provided which biases the transport locking element into the release position, and a further spring is provided which biases the sensor blocking element into the release position. The transport locking element comprises a retaining section which in the locked position engages an arresting section of the sensor blocking element and maintains it in the blocking position.

According to a preferred embodiment of the invention the transport locking element and the sensor blocking element are configured as sliders. In this way the necessary reliable mounting of these two parts can be configured in a relative simple way. A translatory mounting arrangement ensures that all components will still function as desired, even after a working life of up to 15 years, so that the sensor is automatically secured when the belt retractor is removed from the vehicle.

According to this preferred embodiment it is further provided that the springs are compression springs, this offering more safety than the leaf springs employed usually in prior art. During the long time in which the belt retractor may be installed in the vehicle, leaf springs in fact tend to setting more than compression springs so that employing compression springs ensures added assurance that the sensor will be secured again when the belt retractor is removed.

Advantageous aspects of the invention read from the sub-claims.

BRIEF DESCRIPTION OF THE DRAWINGS

The invention will now be described with reference to a preferred embodiment as evident from the attached drawings in which.

DESCRIPTION OF PREFERRED EMBODIMENTS

Figure 1:
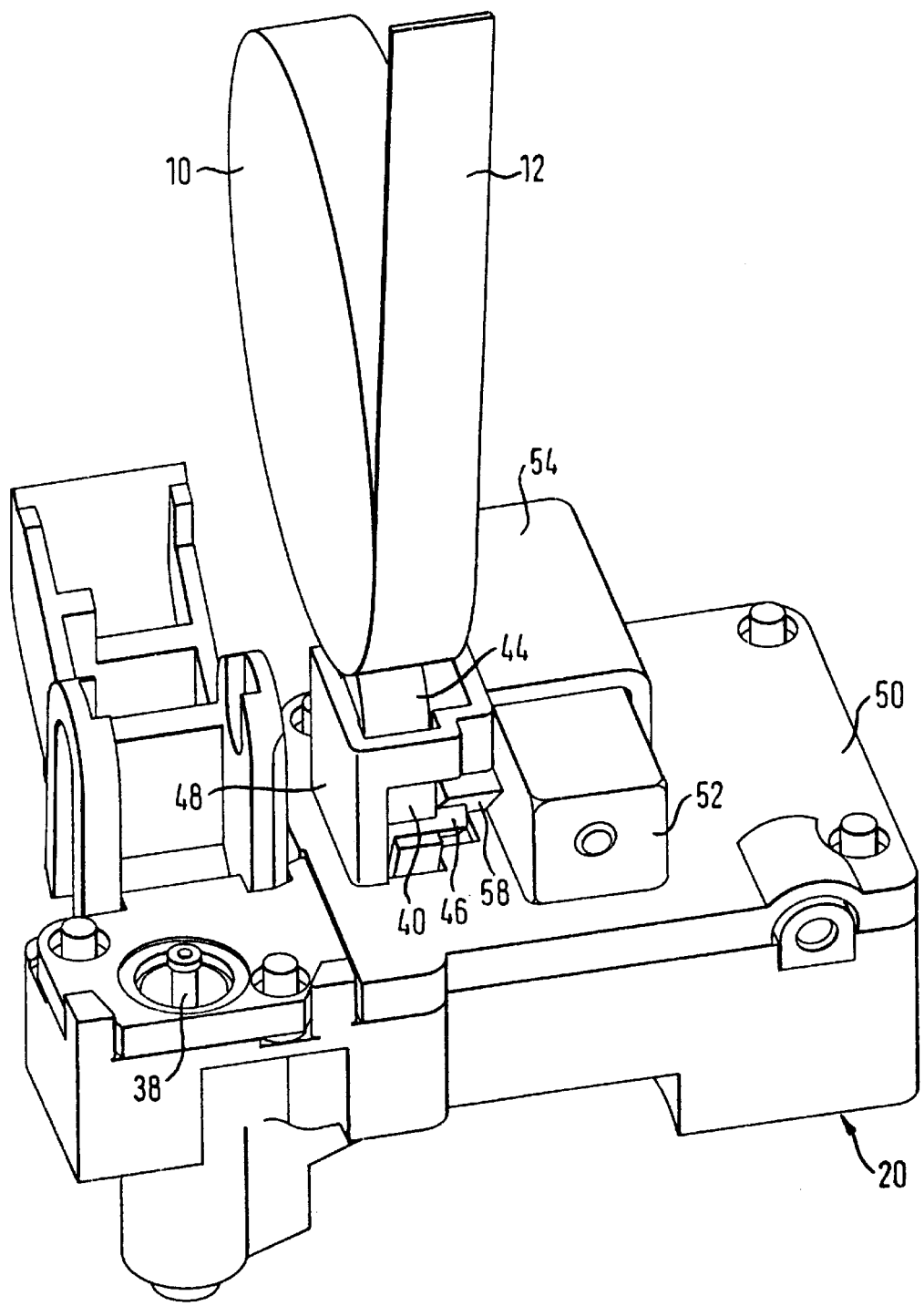
FIG. 1 is a schematic view of a belt retractor according to the invention, the belt tensioning mechanism being omitted for better clarity.
Figure 2:
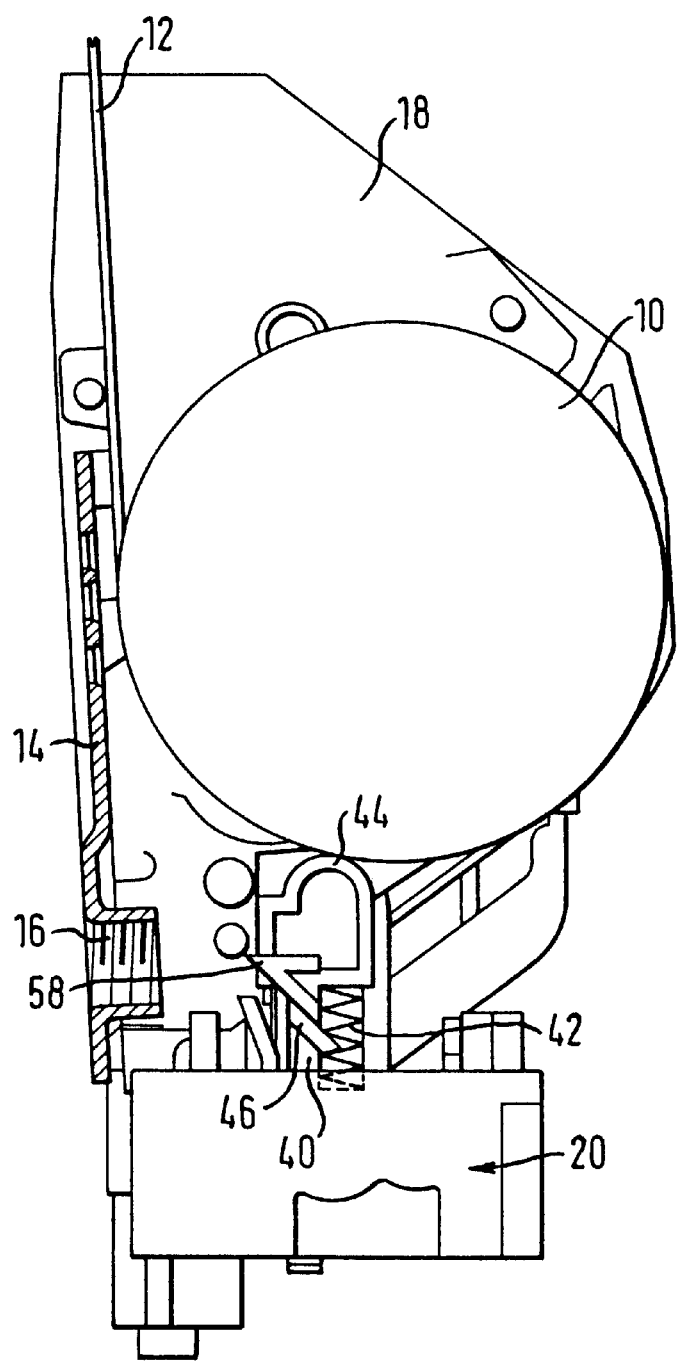
FIG. 2 is a side view of the belt retractor as shown in FIG. 1 with the belt tensioning mechanism.

Referring now to FIGS. 1 to 4 there is illustrated schematically a belt retractor according to a first embodiment of the invention, whereby the parts of the belt retractor not needed in appreciating the invention are omitted for better clarity. The belt retractor contains a belt reel indicated schematically by the coil of the seat belt 10 held therein. Starting from this coil, the seat belt 12 extends which is made available to a vehicle occupant. The belt reel is rotatably mounted in a frame 14 which can be fastened to a vehicle by means of a threaded projection 16 into which a fastener bolt can engage.

Provided in a housing is a belt tensioning mechanism 18 (not shown in detail) which upon activation is able to rotate the belt retractor and hence the coil of the seat belt 10 in the wind-up direction of the belt so that any slack in the seat belt system is eliminated. The belt tensioning mechanism may be of any design; it being, for instance, a pyrotechnic linear drive acting on the belt reel via a cable or gear rack or it may be a rotary piston drive. Details as to its configuration are irrelevant to appreciating the present invention.

Figure 17:
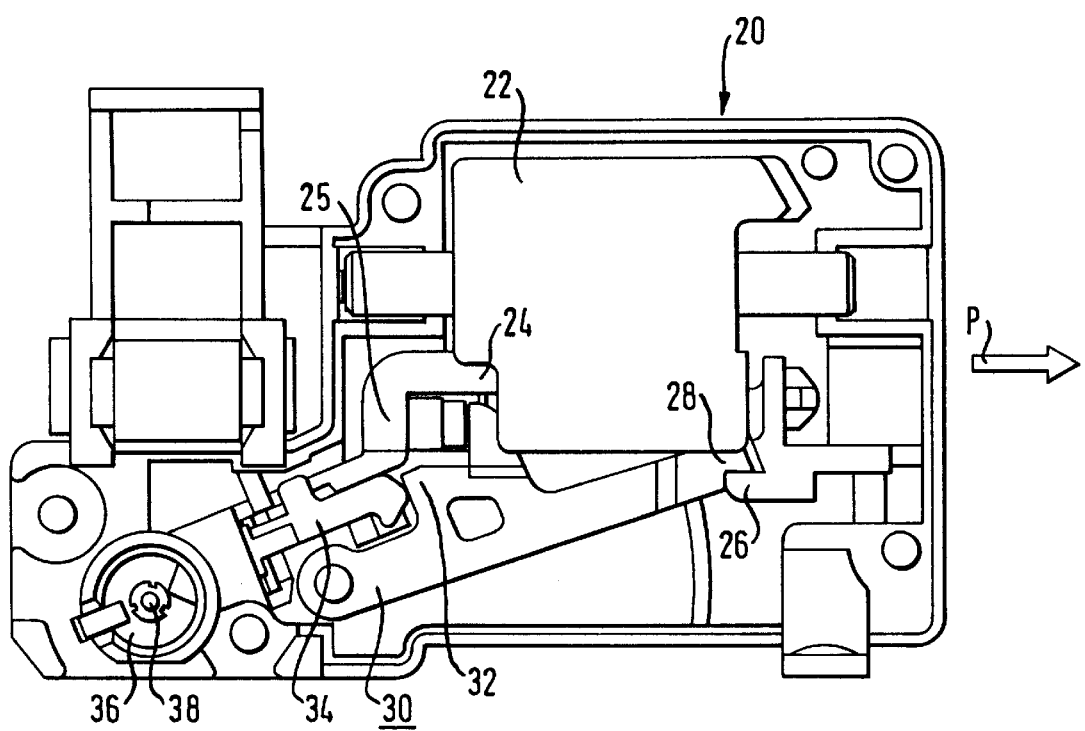
FIG. 17 is a section view of a sensor which may be used in a belt retractor according to the invention and is shown in a neutral position.
Figure 18:
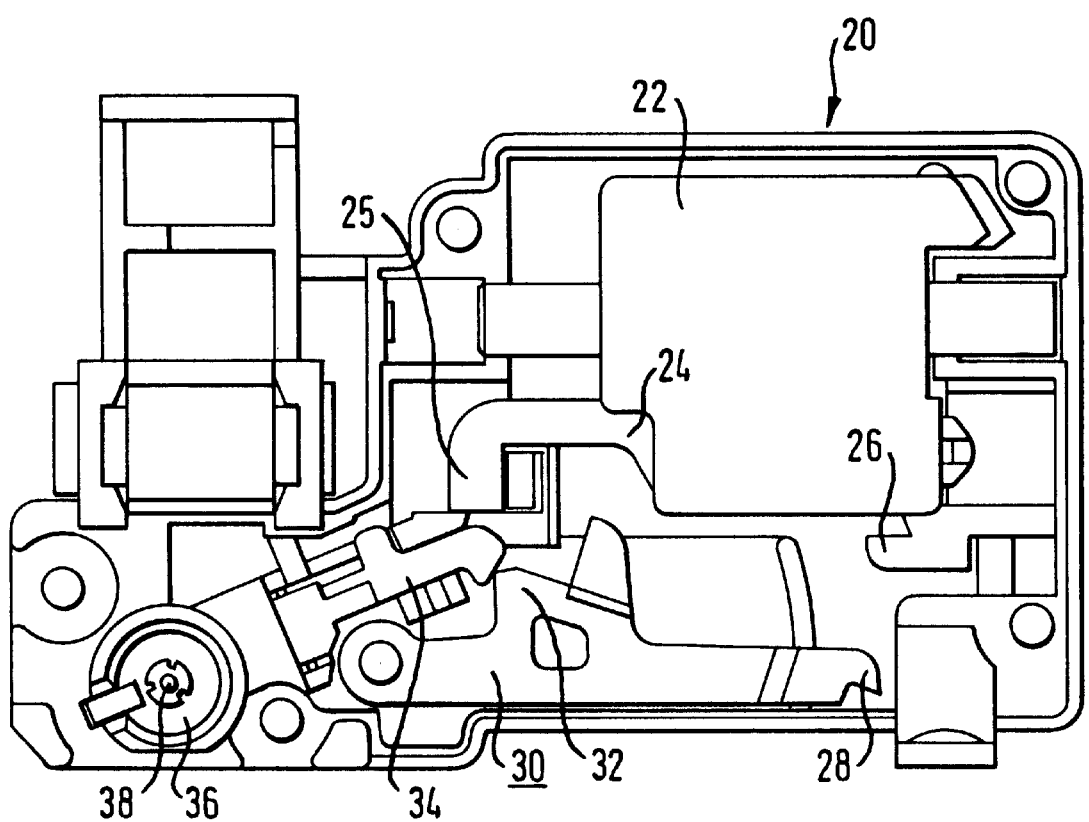
FIG. 18 is a view of the sensor as shown in FIG. 17 in which it is shown in an actuated position.

In case of need, the belt tensioning mechanism is triggered by means of a mechanical sensor 20 (see also FIGS. 17 and 18). The sensor 20 comprises a translationally shiftable inertial mass 22 which by means of a deceleration acting in the direction of the arrow P can be moved from its neutral position as evident from FIG. 17 into its actuated position as evident from FIG. 18.

The sensor contains furthermore an intermediate element 24 which is mounted sliding and, after the inertial mass 22 has executed a predetermined idle stroke from its neutral position toward its actuated position, is entrained by the latter.

The intermediate element 24 is provided with a nose 25, the function of which will be explained further on, and a projection 26 which in the neutral position supports the free end 28 of a supporting lever 30. Supported by a projection 32 of the supporting lever 30 is an actuating finger 34 which is in contact by one conical end with a locking cone 36 of a striker pin 38. In the neutral position as shown in FIG. 17 the actuating finger 34 maintains the striker pin 38 in a pretensioned position. When the inertial mass 22 is shifted from its neutral position into the actuated position, it is the intermediate element 24 that is first entrained as soon as the idle stroke of the inertial mass has been covered. Once the intermediate element 24 has executed a predetermined travel, the free end 28 of the supporting lever 30 is released. Thereafter, the actuating finger 34 can be moved out of its position as shown in FIG. 17 due to it receiving a pushing action resulting from the contact of the conical end of the actuating finger with the locking cone 36 of the striker pin 38. Once the actuating finger has been shifted far enough the striker pin is able to act on an igniter (not shown) of the belt tensioning mechanism, causing it to be triggered.

What is provided is a safety device which ensures that the belt tensioning mechanism can only be triggered when the belt retractor is properly installed in the vehicle and, in addition, the seat belt held by the belt retractor is buckled up by a vehicle occupant. This safety device contains a sensor blocking element 40 configured as a sensor blocking slider which is mounted translationally shiftable in the sensor 20. The sensor blocking slider 40 can be moved between a blocking position—in which it engages the nose 25 of the intermediate element 24, holding it in the position as shown in FIG. 17 and a release position in which the intermediate element 24 can be translated from its position as shown in FIG. 17 into the position as evident from FIG. 18. The sensor blocking slider 40 is biased by a compression spring 42 into its release position in which it, with respect to the FIGS. 2 and 3, protrudes further from the sensor 20 than in its blocking position. At its end facing away from the intermediate element 24 the sensor blocking slider 40 is provided with a sensing element 44 configured as a nose integral with the sensor blocking slider 40. The sensing element 44 serves to sense the diameter of the coil of the seat belt 10.

Furthermore configured on the sensor blocking slider 40 is an arresting section 46 comprising a surface area oriented at an angle of 45° to the shifting direction of the sensor blocking slider. Provided surrounding the sensing element 44 is a guide 48 applied to a cover 50 of the sensor 20.

Figure 3:
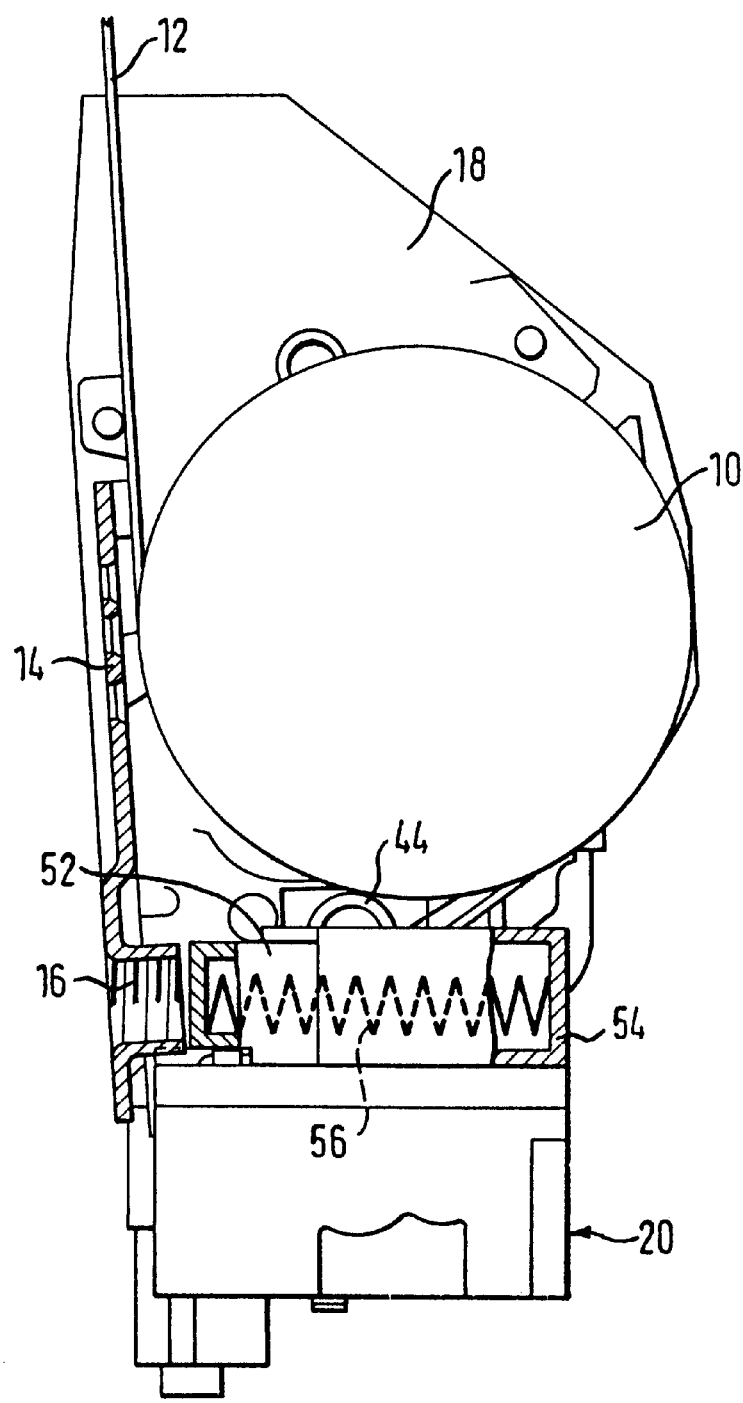
FIG. 3 is another side view of the belt retractor as shown in FIG. 2.
Figure 4:
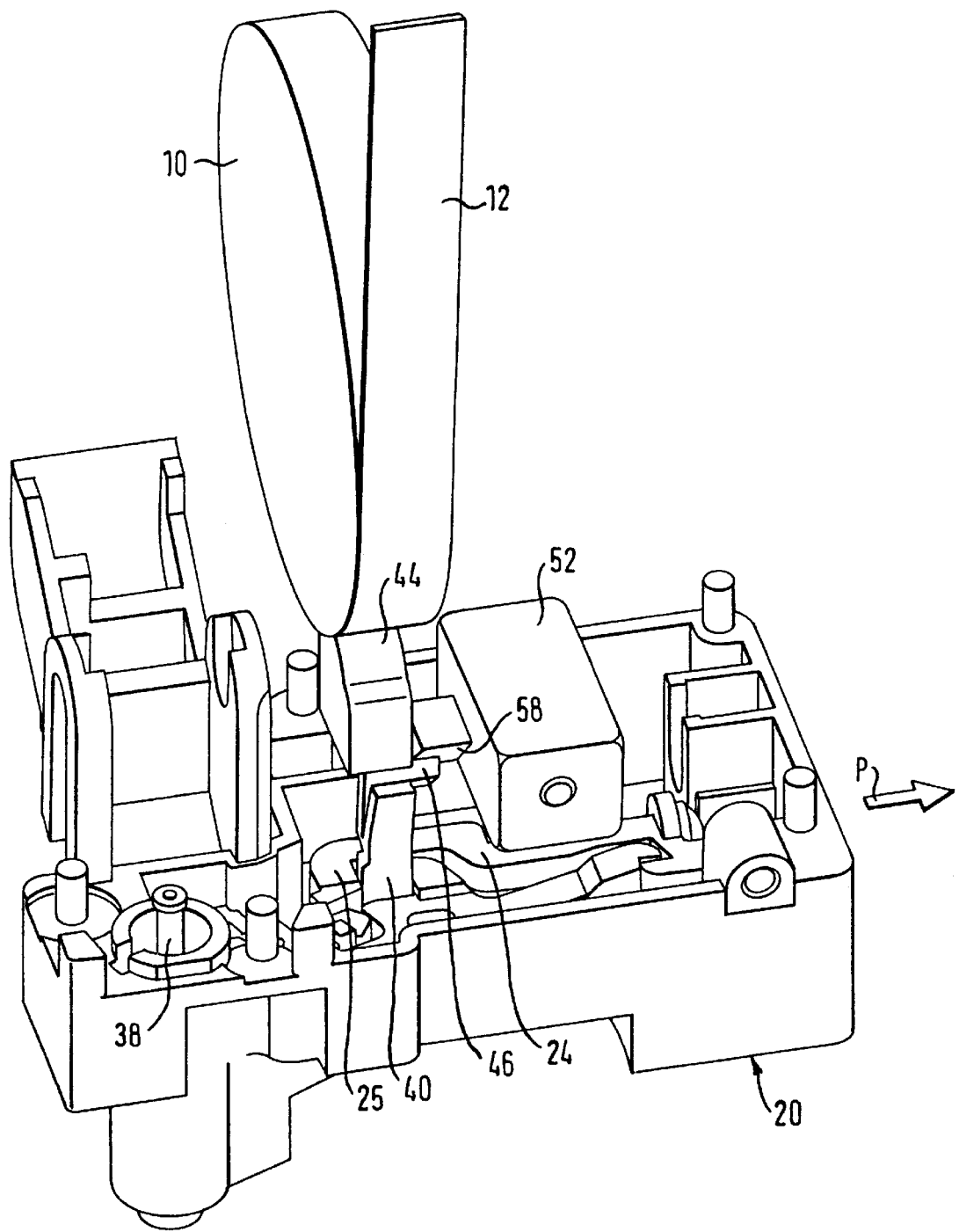
FIG. 4 is the same view as shown in FIG. 1, but with a few housing parts omitted.
Figure 5:
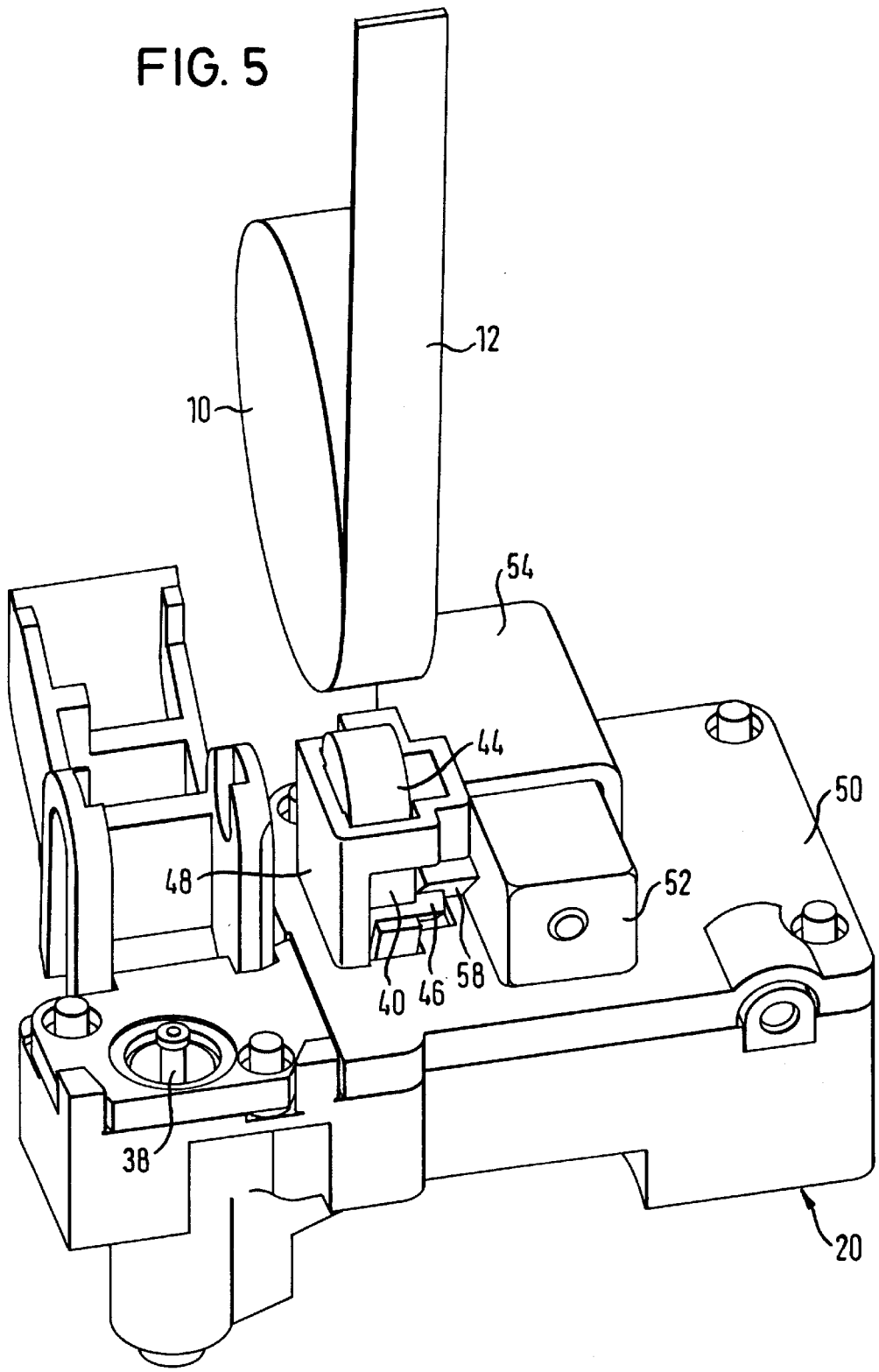
FIGS. 5 to 8 are views corresponding to those of FIGS. 1 to 4, whereby the belt retractor is shown in a second condition.
Figure 6:
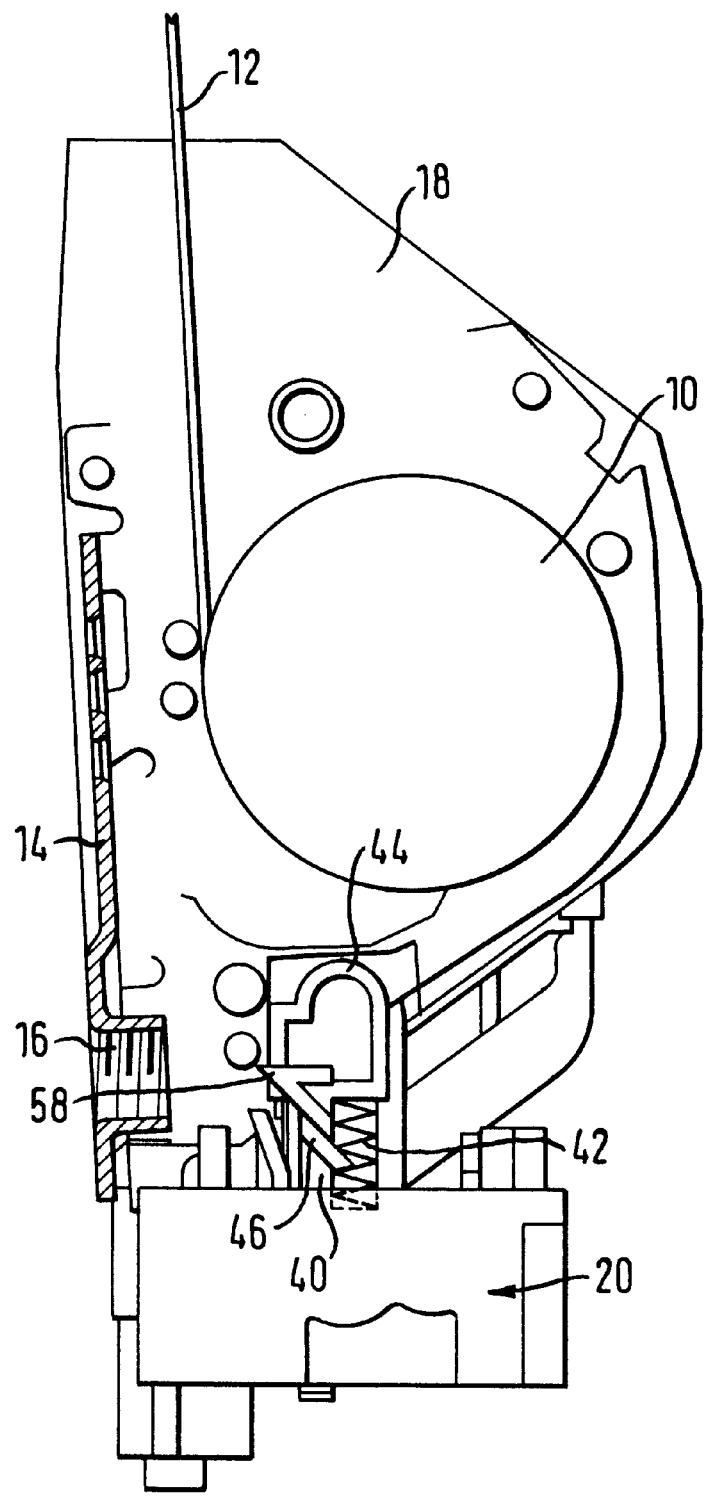
Figure 7:
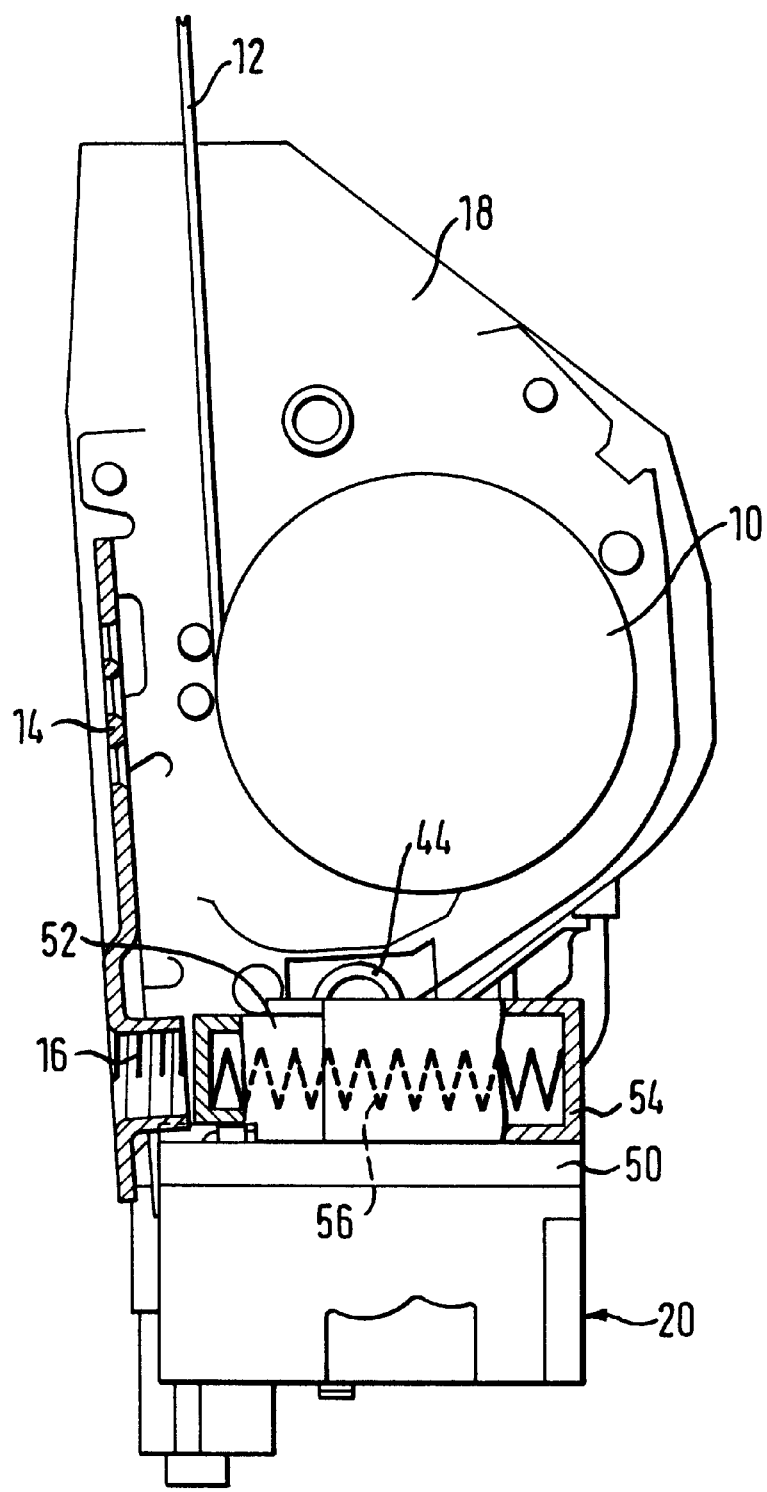
Figure 8:
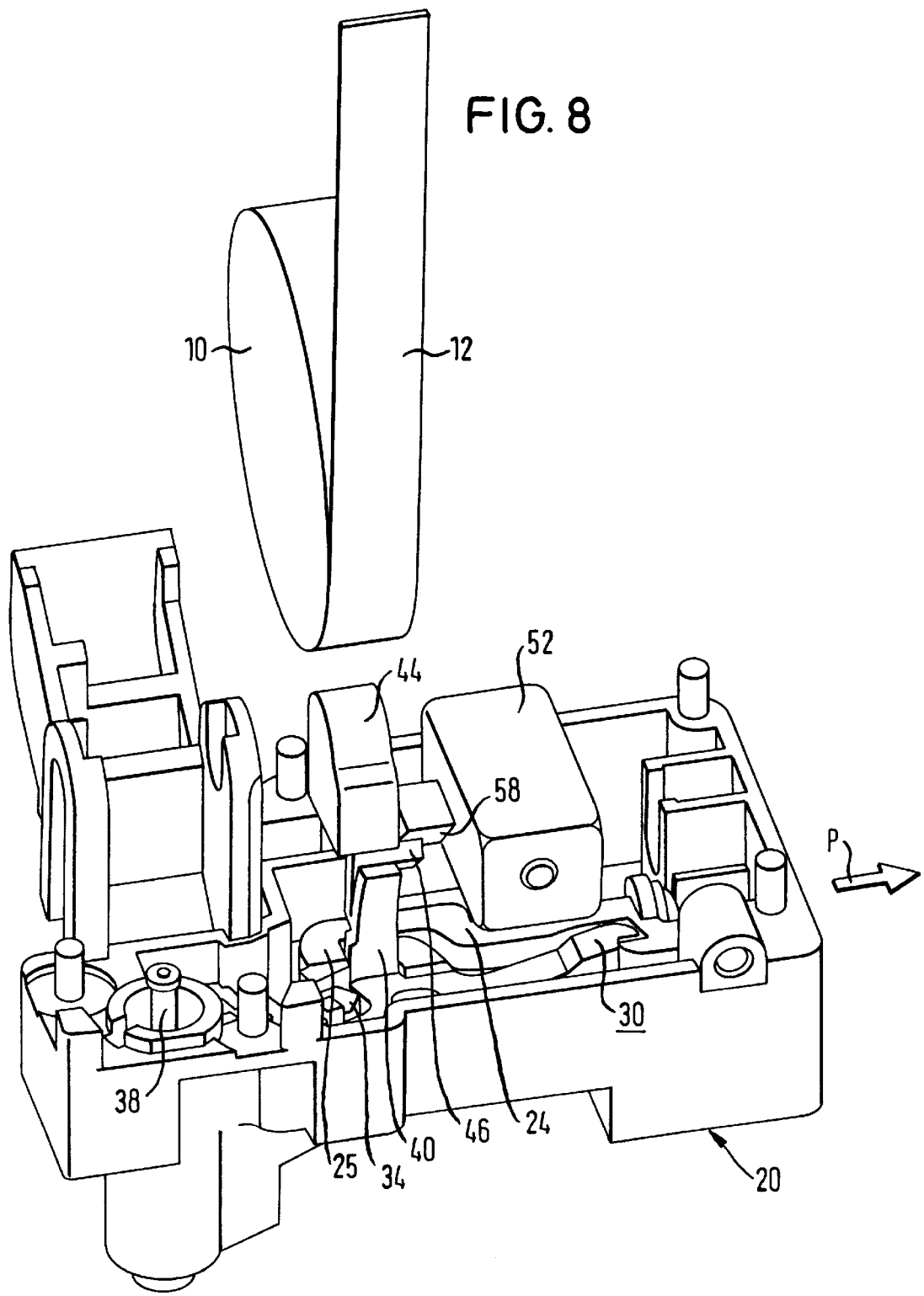
Figure 9:
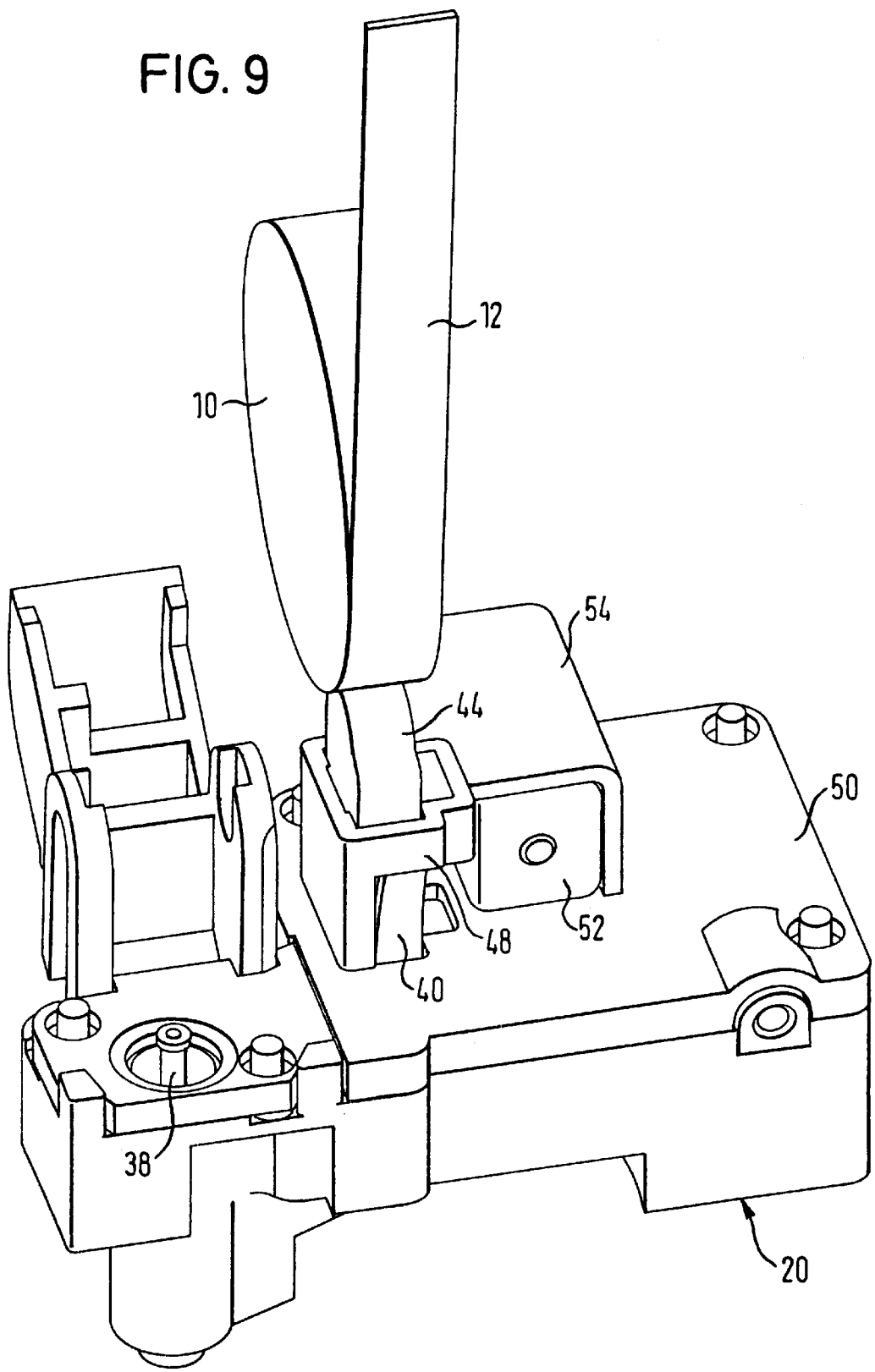
FIGS. 9 to 12 are views corresponding to those of FIGS. 1 to 4, whereby the belt retractor is shown in a third condition.
Figure 10:
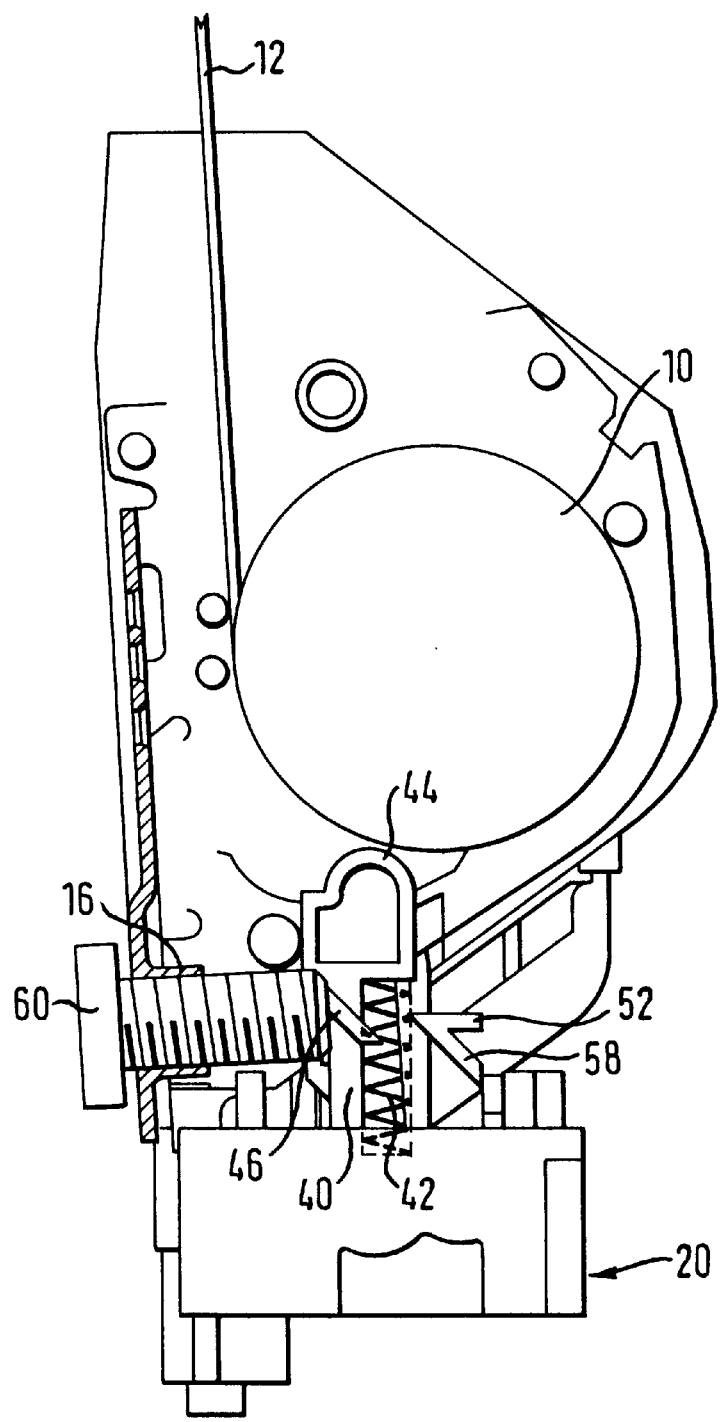
Figure 11:
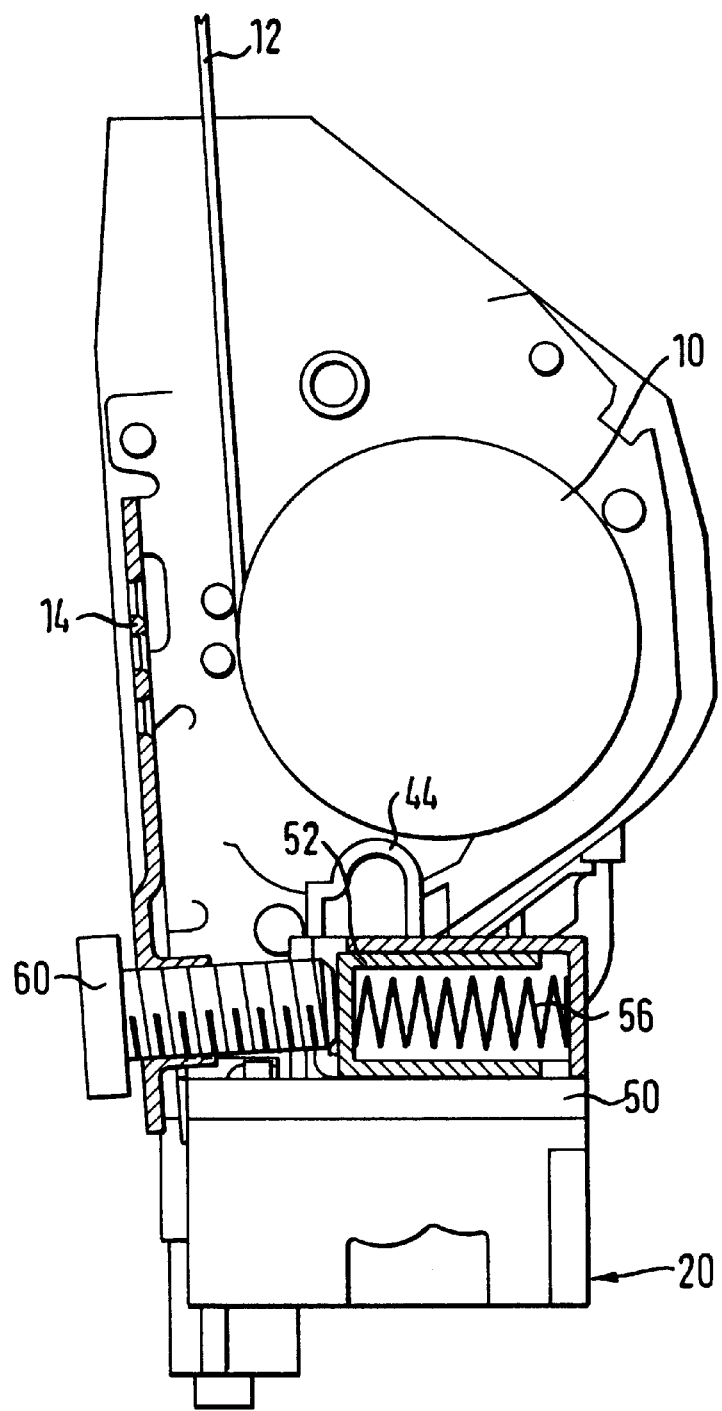
Figure 12:
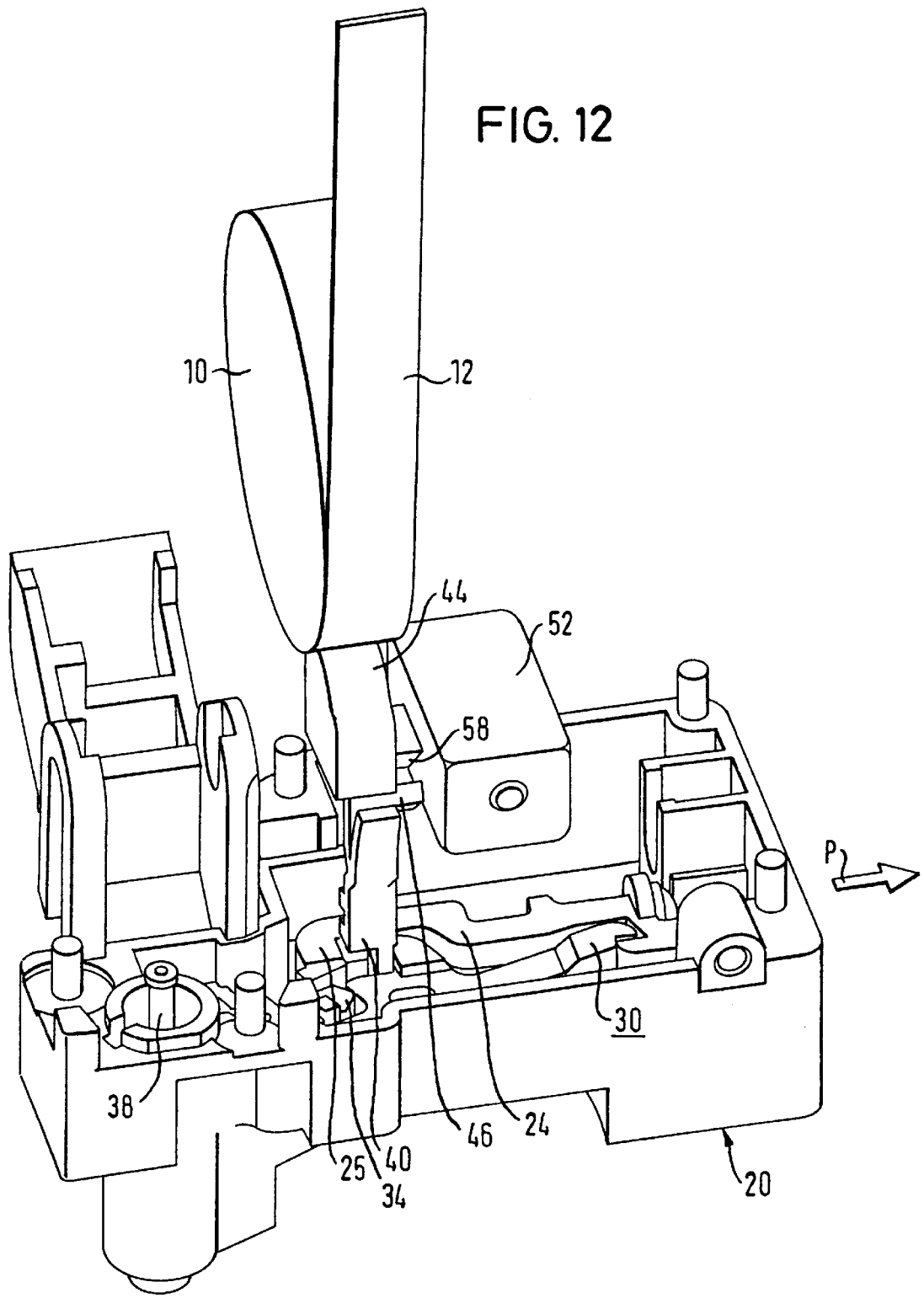
Figure 13:
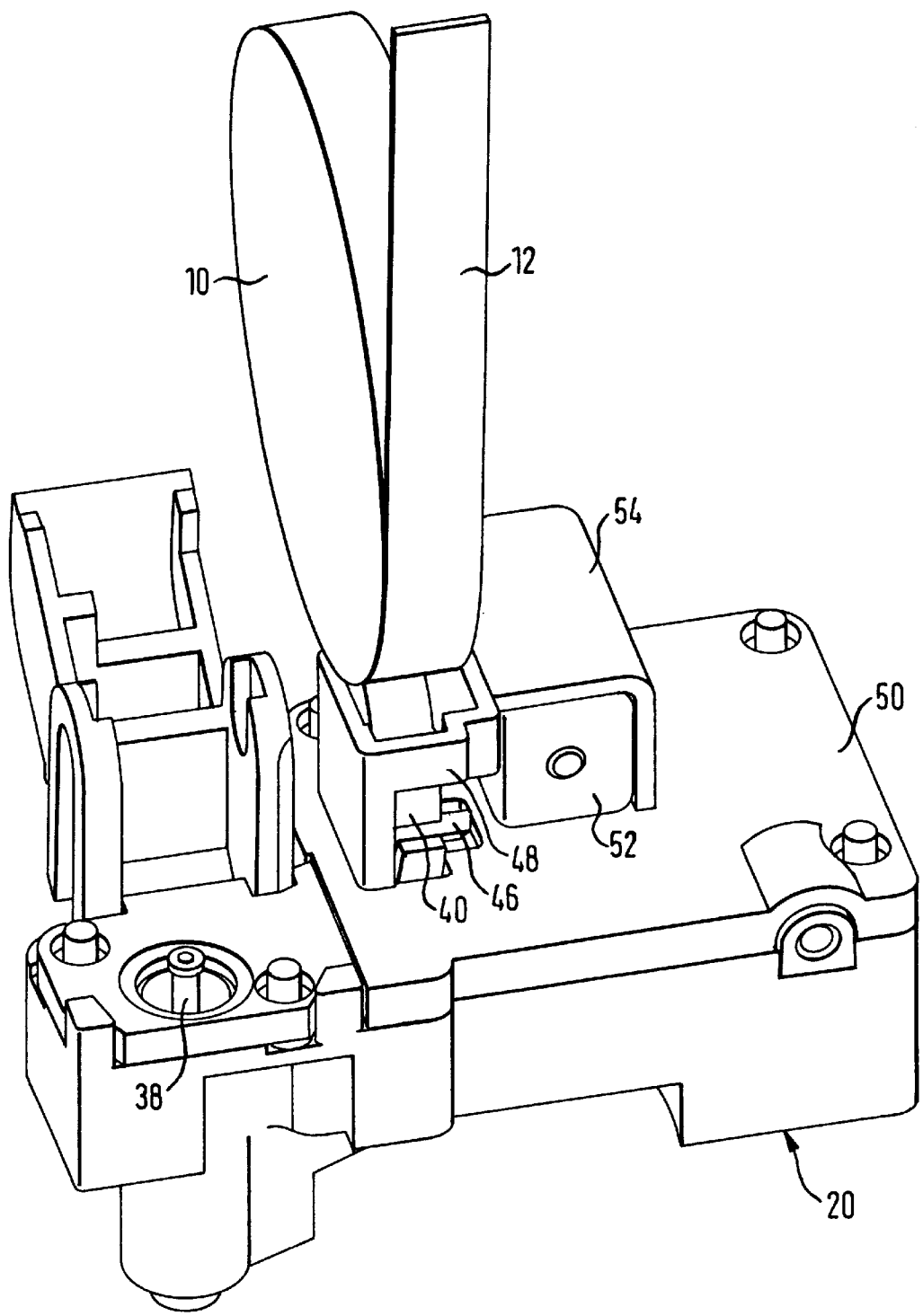
FIGS. 13 to 16 are views corresponding to those of FIGS. 1 to 4, whereby the belt retractor is shown in a fourth condition.
Figure 14:
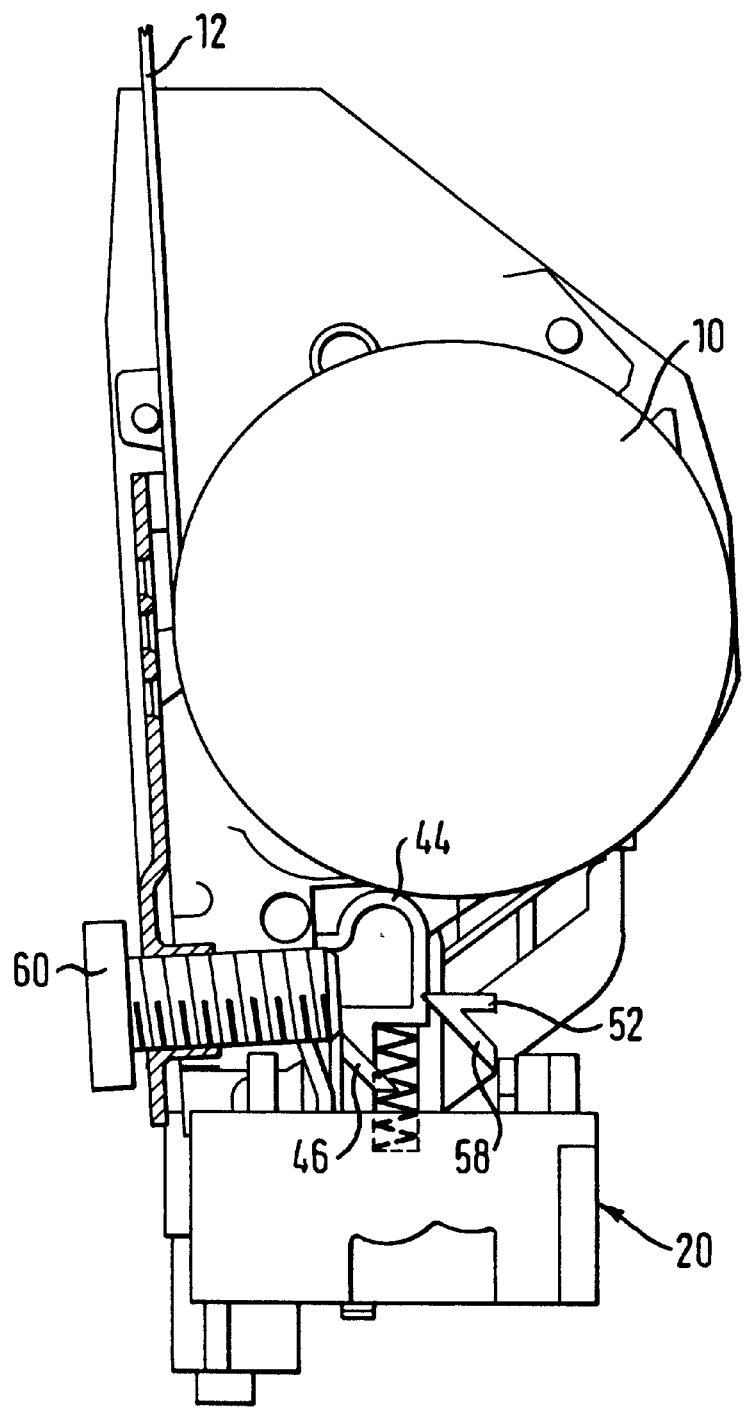
Figure 15:
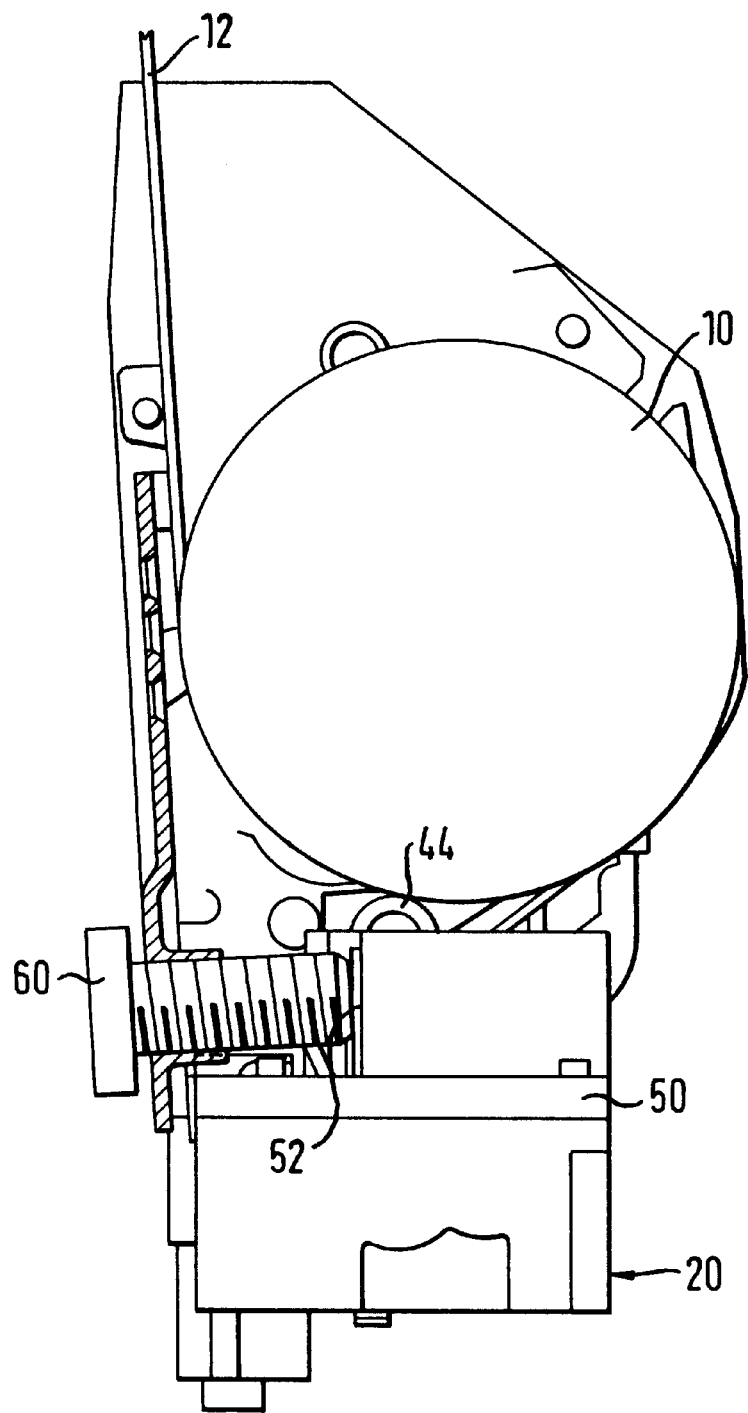
Figure 16:
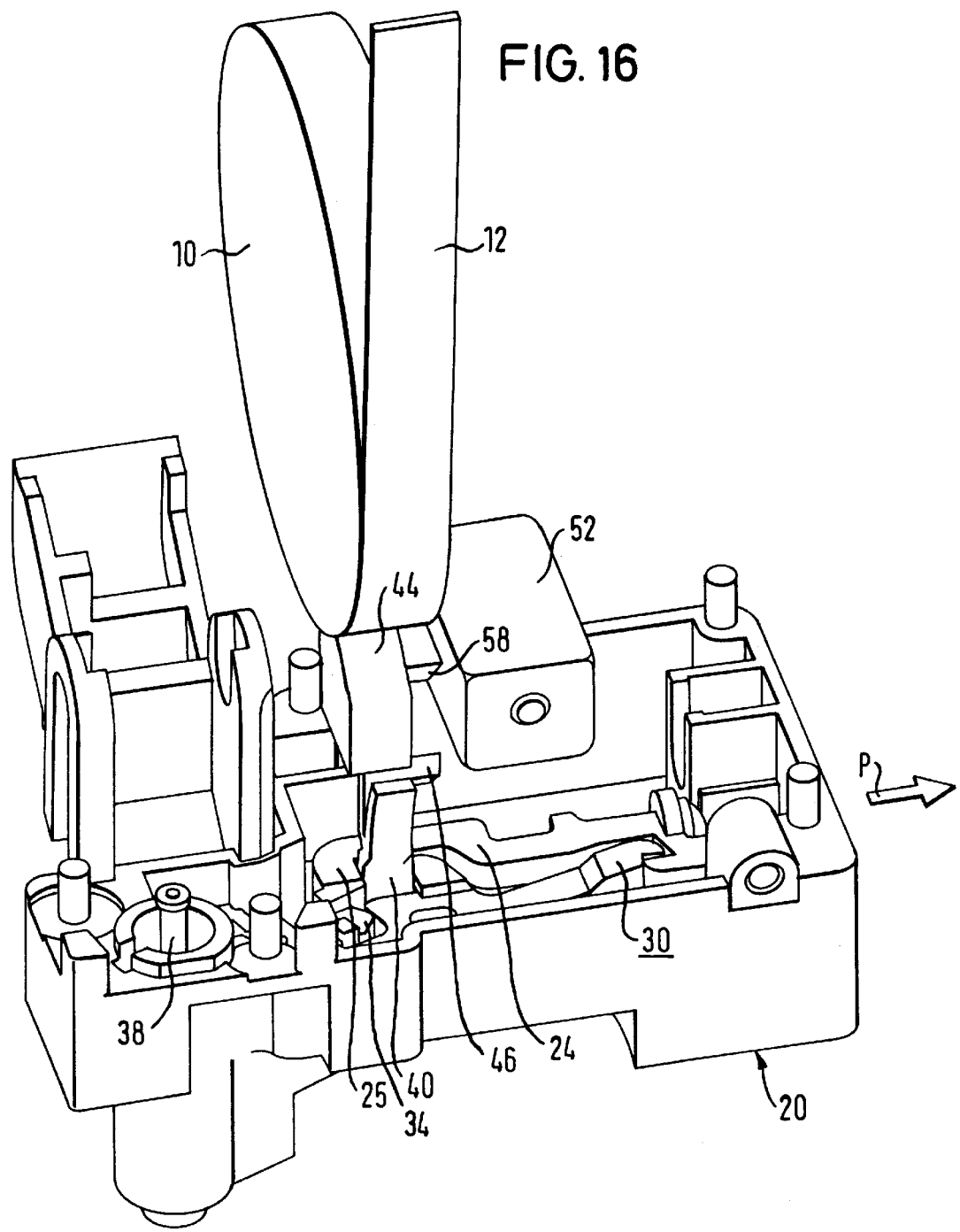

Also provided on the sensor 20 is a transport locking element configured as a transport locking slider 52 which serves to block the sensor 20 when the belt retractor is not properly installed in the vehicle. The transport locking slider 52 is mounted so as to be translationally shiftable between a locked position and a release position in a guide 54 likewise configured on the cover 50 of the sensor 20. The transport locking slider 52 is biased by a spring 56 into its locked position toward the threaded projection 16. The pretension of the spring 56 of the transport locking slider 52 is greater than the pretension of the compression spring 42 of the sensor blocking slider 40. The transport locking slider 52 can be shifted from this locked position into the release position, in a direction perpendicular to the direction of movement of the sensor blocking slider 40 (to the right as shown in FIG. 3).

Configured on the transport locking slider 52 is a retaining section 58 comprising a surface area oriented at an angle of 45° relative to the direction of movement of the transport locking slider 52. This surface area is oriented parallel to the surface area of the arresting section 46 configured on the sensor blocking slider 40.

Referring now to FIGS. 1 to 4 there is illustrated the belt retractor in a condition in which it is not installed in a vehicle and in which no belt webbing has been pulled off from the belt retractor. The coil of the seat belt 10 thus has its maximum diameter. In this condition the transport locking slider 52 being in contact with the threaded projection 16 is in its locked position in which the retaining section 58 is supported by the arresting section 46 of the sensor blocking slider 40. Since the two surface areas of the retaining section and arresting section 46 in contact with each other are inclined at an angle of 45° to the direction of movement of the transport locking slider 52 and the sensor blocking slider 40, respectively, the sensor blocking slider 40 is urged against the actuation of its compression spring 42 into the blocking position in which the intermediate element 24 is locked in the position as shown in FIG. 17. At the same time the sensing element 44 is in contact with the coil of the seat belt 10. The sensing element 44 is dimensioned such that in this condition the sensor blocking slider 40 is urged from the coil of the seat belt 10 via the sensing element 44 into the blocking position. The sensor blocking slider 40 is thus doubly biased into its blocking position, i.e. for one thing, by the transport locking slider 52 via the retaining section 58 and the arresting section 46 and, for another, by the sensing element 44. In this way it is safely and reliably inhibited that the sensor triggers the belt tensioning mechanism due to jolting as may occur during transport or in handling the belt retractor.

Referring now to FIGS. 5 to 8 there is illustrated the belt retractor in a second condition, whereby like reference numerals are used to identify the components already known from FIGS. 1 to 4 so that reference can be made to the description thereof.

In this second condition a specific length of belt webbing has been pulled off from the belt retractor, i.e. the coil of the seat belt 10 now has a smaller diameter, so the sensing element 44 is no longer in contact with the coil of the seat belt. Despite this, the spring 42 of the sensor blocking slider 40 is incapable of translating the latter into the release position, since the sensor blocking slider 40 is biased by the transport locking slider 52 via the retaining section 58 and the arresting section 46 into the blocking position, due to the pretension of the spring 56 of the transport locking slider 52 being greater than the pretension of the compression spring 42 of the sensor blocking slider 40. This ensures that—even when belt webbing is pulled off during transport or in handling the belt retractor—the sensor is safely and reliably secured against triggering of the belt tensioning mechanism as long as the belt retractor is not installed in a vehicle.

Referring now to FIGS. 9 to 12 there is illustrated the belt retractor in a third condition. Here too, like reference numerals are used to identify the components already known from FIGS. 1 to 4 so that reference can be made to the description thereof.

In this third condition the sensor 20 is not secured so the belt tensioning mechanism could be triggered by a corresponding deceleration in the direction of the arrow P. By means of a fastener bolt 60 screwed into the threaded projection 16, the transport locking slider 52 has been moved from its locked position into the release position in which the retaining section 58 no longer engages the arresting section 46 of the sensor blocking slider. Furthermore, a specific length of belt webbing has been pulled off from the belt retractor so that the coil of the seat belt 10 has a diameter which is less than a predetermined diameter. As of this predetermined diameter, the sensor blocking slider 40 is shifted—by the action of the spring 42 biasing it—so far toward the coil of the seat belt into its release position that it no longer engages the nose 25 of the intermediate element 24.

Accordingly, the intermediate element can be entrained by the inertial mass when the latter is moved from its neutral position into the actuated position. Thus, in this condition in which the belt retractor is installed in the vehicle and in addition the seat belt has been buckled up by the vehicle occupant, the belt tensioning mechanism can be triggered.

Referring now to FIGS. 13 to 16 there is illustrated the belt retractor in a fourth condition. Here again, like reference numerals are used to identify the already known components so that reference can be made to the description thereof.

In the fourth condition the belt retractor is installed in the vehicle by means of the fastener bolt 60, however, no belt webbing having been pulled off from the belt retractor here. This is the case, for instance, when the belt retractor makes the seat belt available for the front-passenger seat but the front-passenger seat is either unoccupied or the vehicle occupant seated therein has not buckled up. Although in this condition the transport locking slider 52 is maintained in its release position by the fastener bolt 60, in which the retaining section 58 is not in contact with the arresting section 46, the sensing element 44 in contact with the coil of the seat belt 10 prevents the sensor blocking slider 40 from being urged by its compression spring 42 from the blocking position into the release position. Thus, the sensor blocking slider 40 prevents the intermediate element 24 from being entrained by the inertial mass 22. This ensures that the belt tensioning mechanism is not triggered in an accident situation since tensioning the seat belt makes no sense when not buckled up.

When the fastener bolt 60 is removed and the belt retractor detached, the spring 56 ensures that the transport locking slider 52 is returned into its locked position. In this position, the sensor blocking slider 40 is urged into the blocking position by means of the retaining section 58 and the arresting section 46, in which an activation of the belt tensioning mechanism is prevented. Since the transport locking slider 52 and the sensor blocking slider 40 are both mounted translationally shiftable and the two springs 56 and 42 are compression springs which tend to settle only very slightly in time it is ensured that the sensor 20 will be reliably locked on detaching of the belt retractor even after it had been installed for a long time, for example, 15 years.

Figure 19:
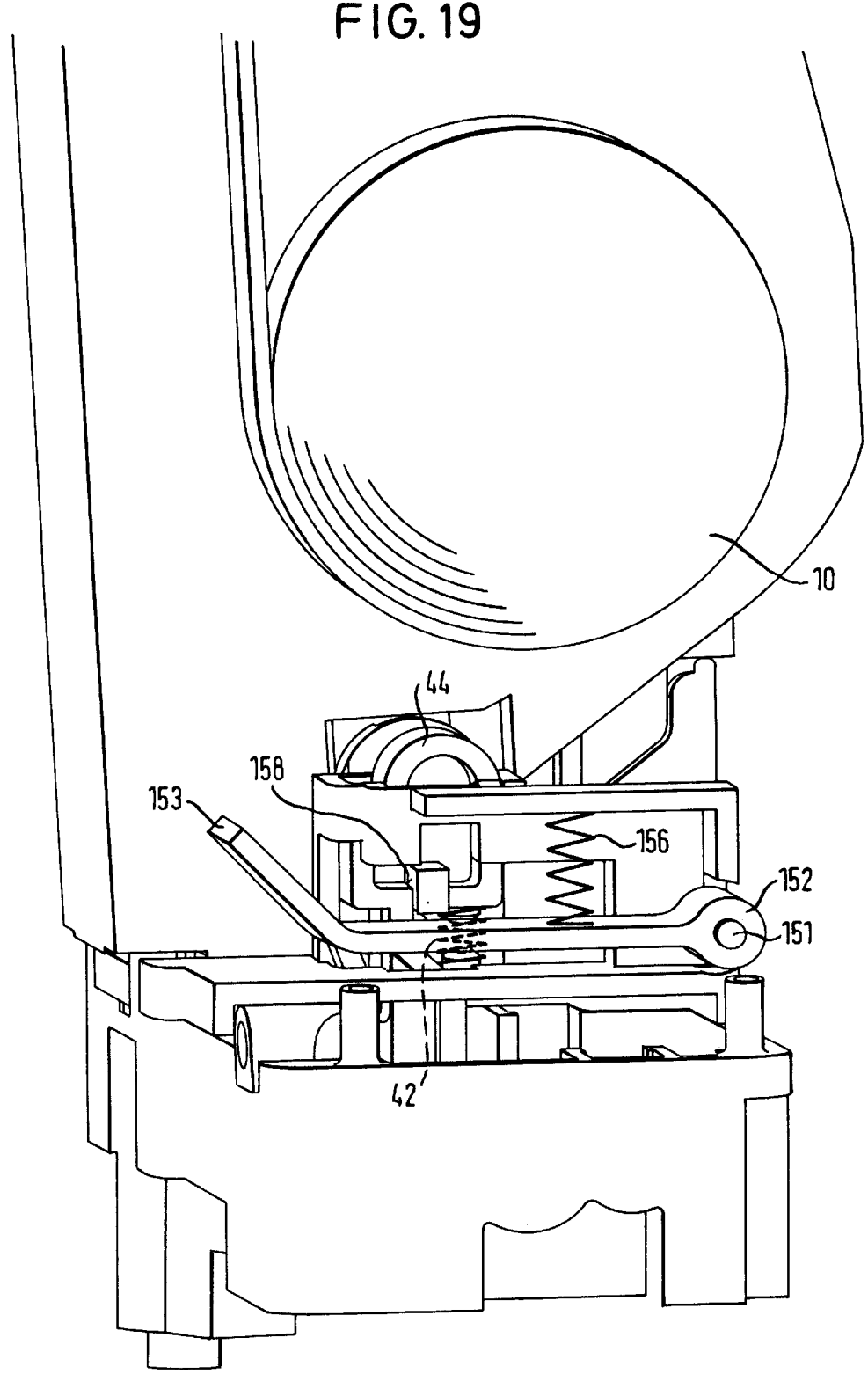
FIG. 19 is a schematic view of a belt retractor according to a second embodiment of the invention.
Figure 20:
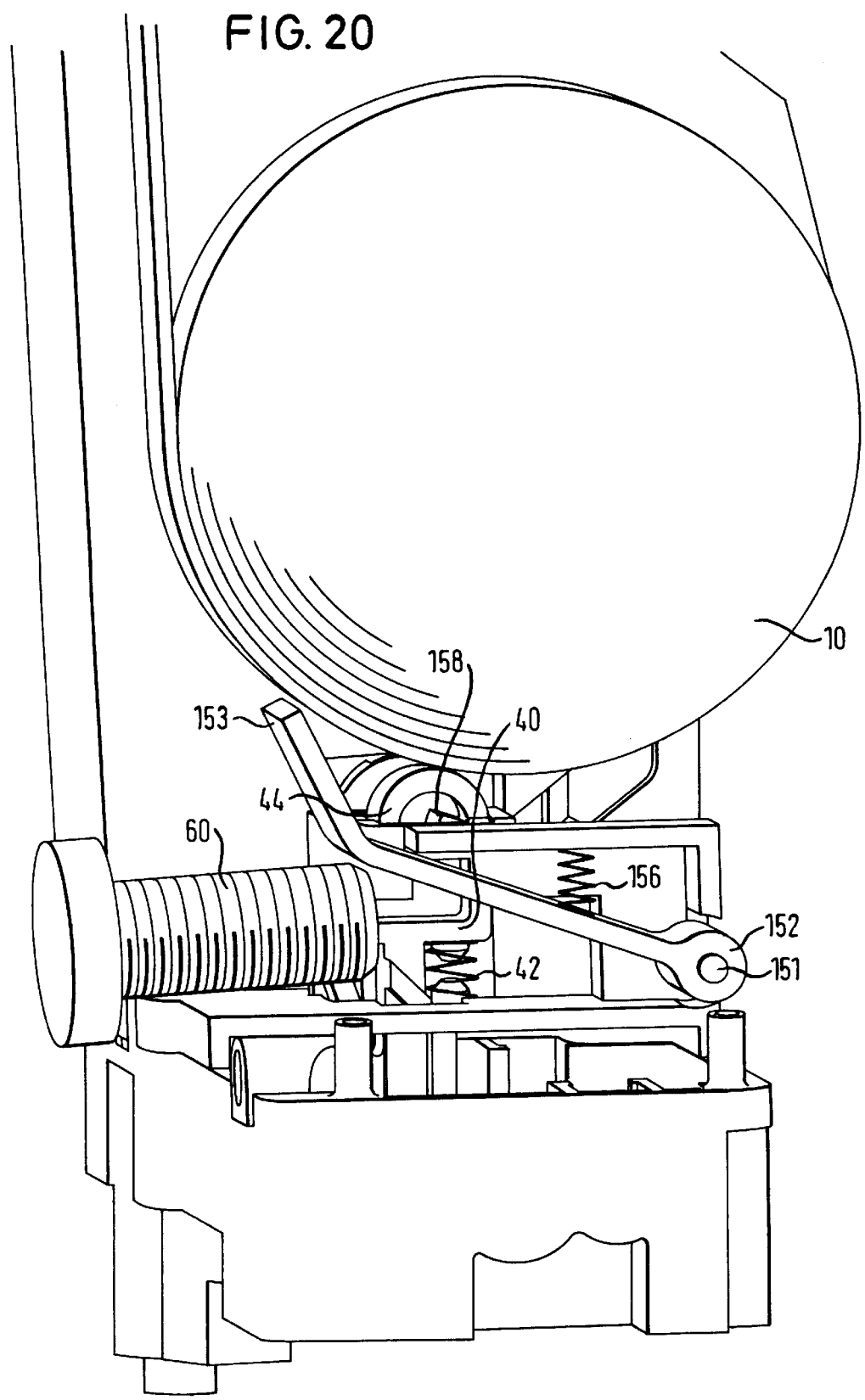
FIG. 20 is a view of the sensor as shown in FIG. 19, whereby the belt retractor is shown in a second condition.
Figure 21:
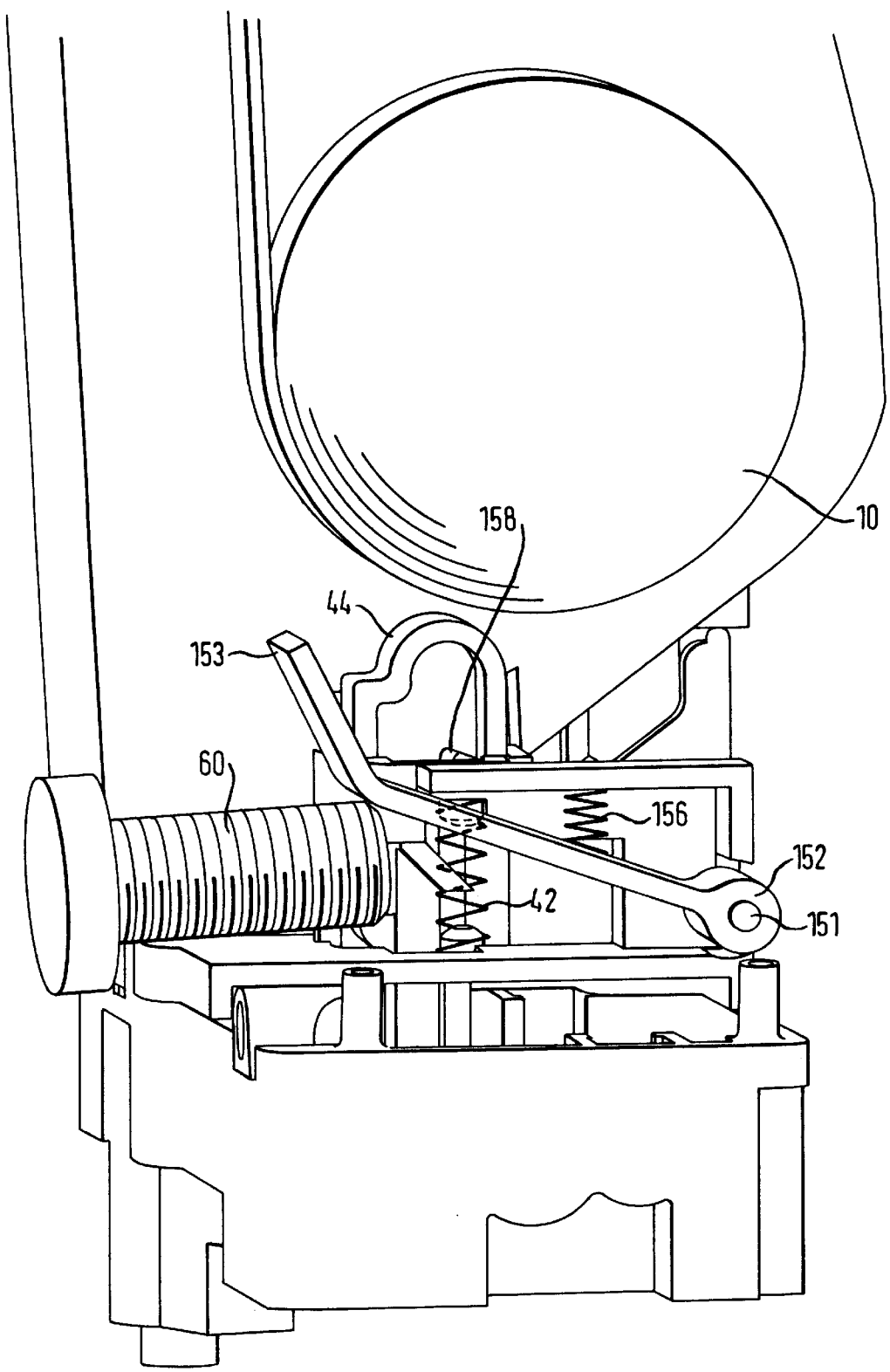
FIG. 21 is a view of the sensor as shown in FIG. 19, hereby the belt retractor is shown in a third condition.

Referring now to FIGS. 19 to 21 there is illustrated the belt retractor according to a second embodiment of the invention. Like reference numerals are used to identify the components already known from the first embodiment so reference can be made to the description thereof.

In this embodiment, the transport locking element is configured as a transport locking lever 152 mounted pivotably on a trunnion 151 and comprising an end 153 cranked upwards with respect to FIG. 19. The transport locking lever 152 is biased by a compression spring 156 downwards with respect to FIG. 19 into its locked position. Configured on the transport locking lever 152 is a retaining section 158 supported by the arresting section 46 of the sensor blocking slider 40 urging it against the biasing force of its compression spring 42 into the blocking position.

The transport locking lever 152 is moved from its blocked position shown in FIG. 19 into its release position shown in FIG. 20 by screwing in the fastener bolt 60, whilst the fastener bolt 60 is sliding on the cranked end 153 of the transport locking lever 152 pushing it upwards with respect to FIG. 20. Thus the retaining section 158 releases the sensor blocking slider 40 which is shifted by the biasing force of the spring 42 toward the coil of the seat belt 10. With its sensing element 44, the sensor blocking slider 40 is now in contact with the coil of the seat belt so that when the coil has a predetermined diameter, the sensor blocking slider 40 reaches its release position, as is shown in FIG. 20. The further function is similar to that of the belt retractor according to the first embodiment.

Figure 22:
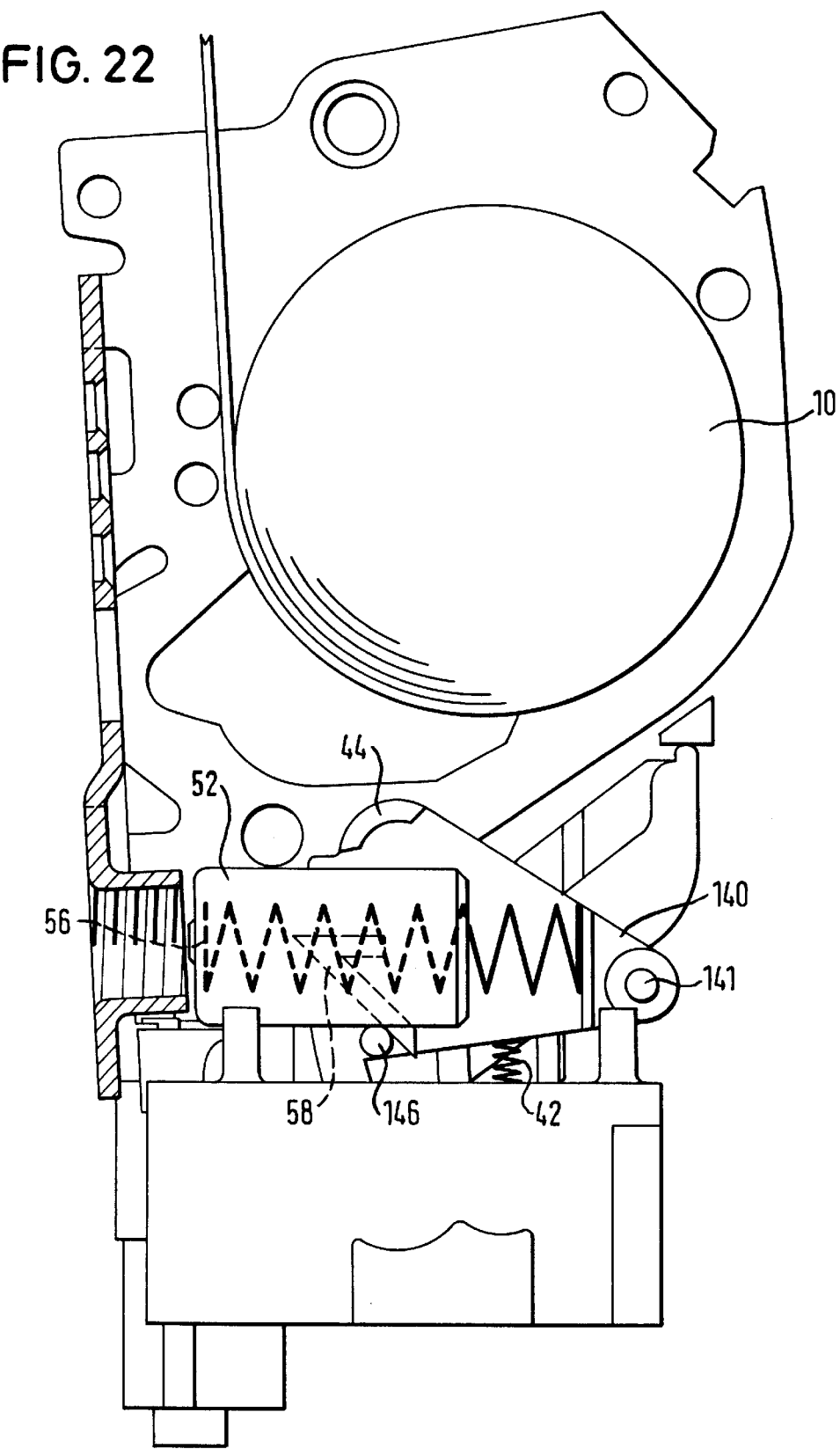
FIG. 22 is a schematic view of a belt retractor according to a third embodiment of the invention.
Figure 23:
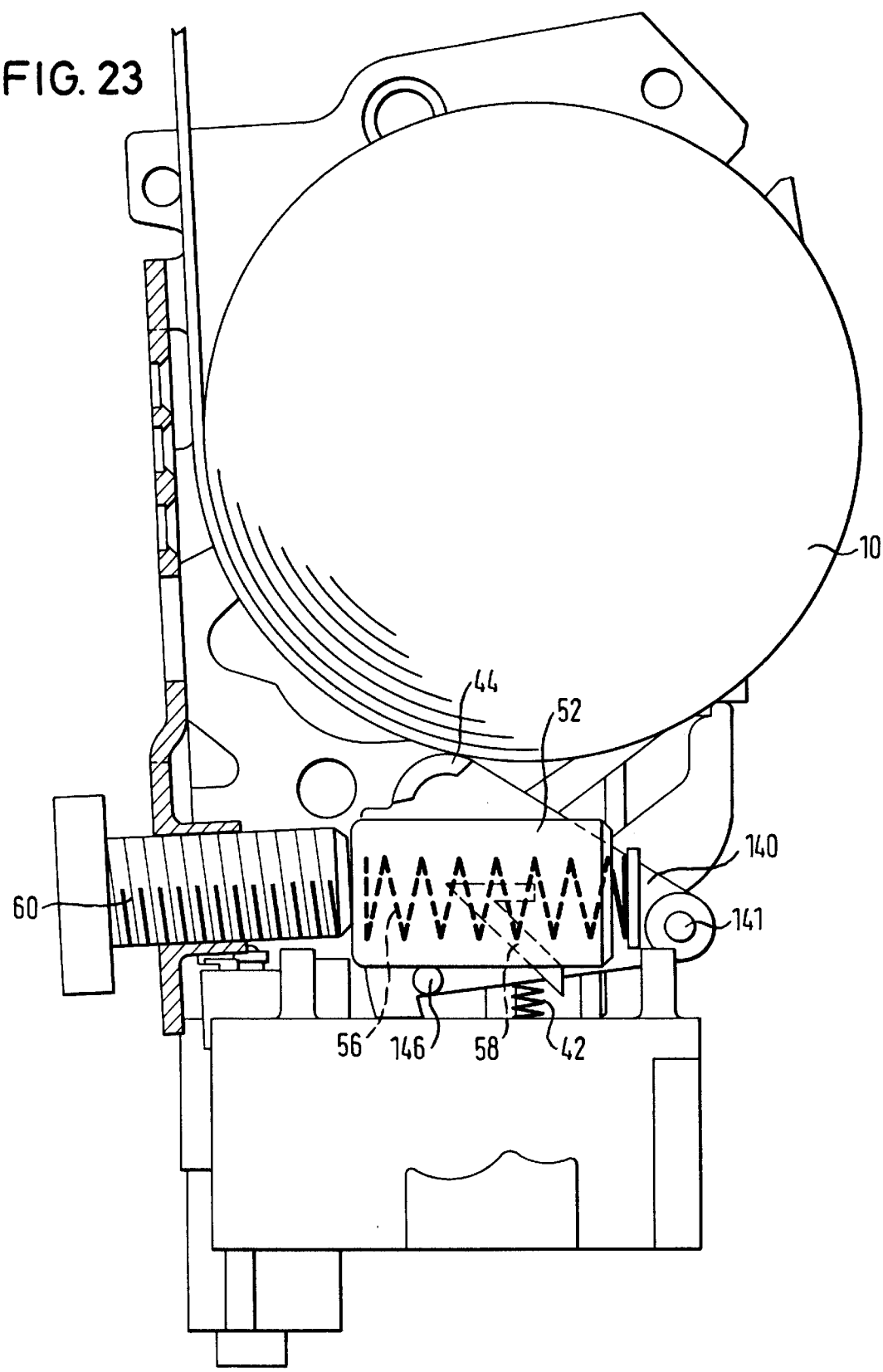
FIG. 23 is a view of the sensor as shown in FIG. 22, whereby the belt retractor is shown in a second condition.
Figure 24:
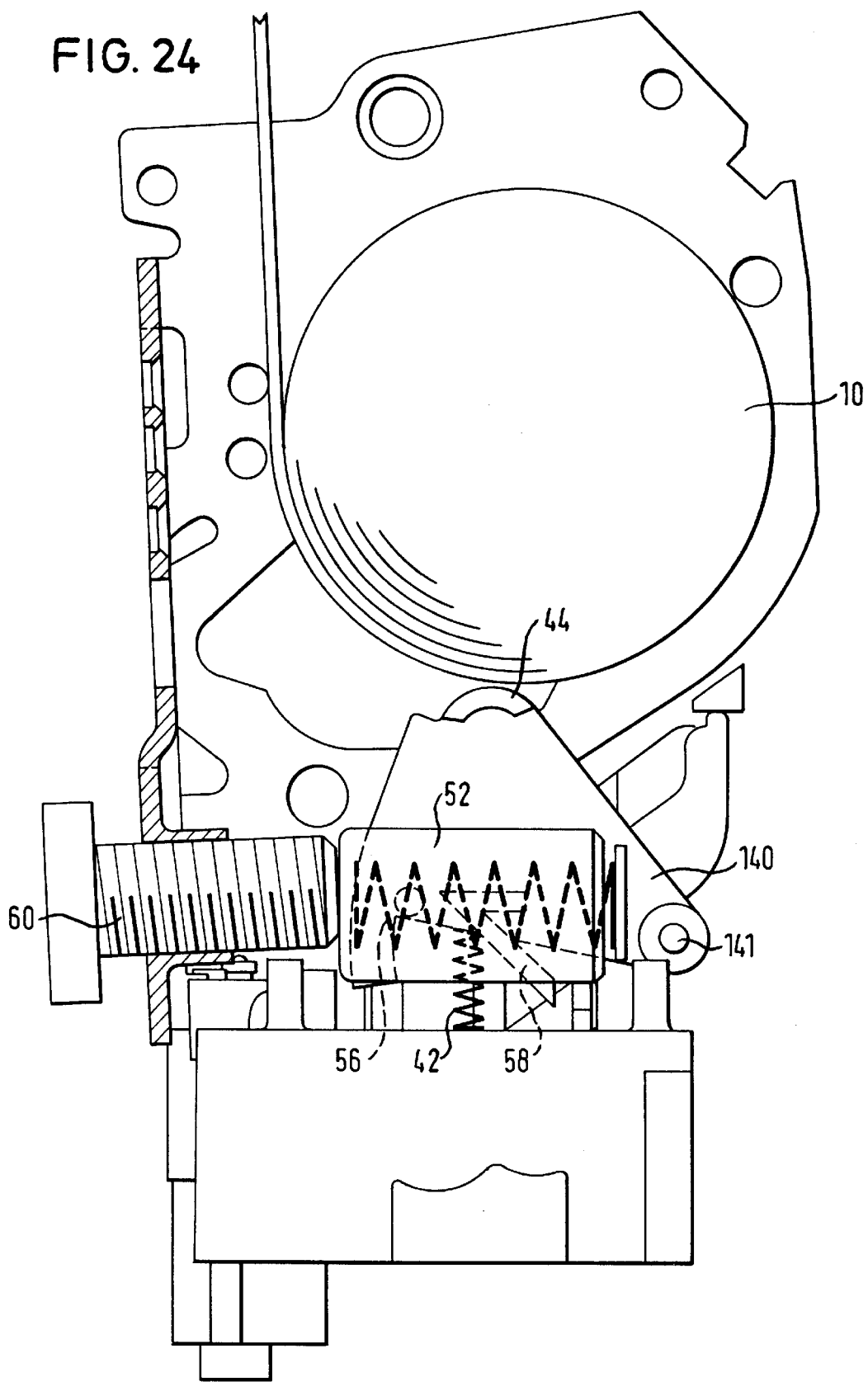
FIG. 24 is a view of the sensor as shown in FIG. 22, whereby the belt retractor is shown in a third condition.

Referring now to FIGS. 22 to 24 there is illustrated the belt retractor according to a third embodiment of the invention. Again like reference numerals are used to identify the components already known from the precedent embodiments so reference can be made to the description thereof.

In this embodiment, the sensor blocking element is configured as a sensor blocking lever 140 mounted pivotably on a trunnion 141 and biased by the spring 42 from a blocking position shown in FIG. 22 into a release position shown in FIG. 24. An arresting section 146 configured as a cone is provided on the sensor blocking lever 140, the cone supporting the retaining section 58 of the transport locking slider 52. At its end facing away from the intermediate element 24 the sensor blocking lever 140 is provided with a sensing element 44 configured as a nose integral with the sensor blocking lever 140. The sensing element 44 serves to sense the diameter of the coil of the seat belt 10.

In FIG. 22 the transport locking slider 52 is located in its locked position in which the retaining section 58 of the transport locking slider 52 is in contact with the arresting section 146, thus maintaining the sensor blocking lever 140 in its blocking position against the force of the compression spring 42. As soon as the transport locking slider 52 is moved into its release position shown in FIG. 23 by screwing in the fastener bolt 60, the retaining section 58 releases the arresting section 146 so that by means of its sensing element 44, the sensor blocking lever 140 is in contact with the coil of the seat belt.

If the diameter of the coil of the seat belt 10 is reduced by pulling off the belt webbing, the compression spring 42, as soon as the diameter of the coil has reached as predetermined value, pivots the sensor blocking lever 140 in the direction of the coil of the seat belt 10 until the sensor blocking lever 140 has reached its release position shown in FIG. 24.

The further function is again similar to that of the belt retractor according to the first embodiment.

What is claimed is:

1. A belt retractor for a vehicular seat belt system, comprising a belt reel taking up a seat belt, a belt tensioning mechanism capable of biasing said belt reel in a winding direction of said seat-belt, and a sensor capable of triggering said belt tensioning mechanism and provided with a safety device translatable by installation of said belt retractor in a vehicle from a secured condition in which said sensor is blocked, into a released condition in which said sensor is ready to trigger, said safety device including a sensor blocking element which is movable between a blocking position in which said sensor is blocked, and a release position in which said sensor is ready to trigger, and including a transport locking element and a sensing element, said sensing element sensing a diameter of a coil of said seat belt on said belt reel and allowing a movement of said sensor blocking element into said release position only when said diameter is below a predetermined value, said transport locking element being movable between a locked position and a release position, a spring being provided which biases said transport locking element into said release position, and a spring being provided which biases said sensor blocking element into said release position, said transport locking element comprising a retaining section which in said locked position engages an arresting section of said sensor blocking element and maintains said sensor blocking element in said blocking position.

2. The belt retractor of claim 1, wherein said transport locking element and said sensor blocking element are formed as sliders.

3. The belt retractor of claim 1, wherein said sensor blocking element is formed as a lever.

4. The belt retractor of claim 1, wherein said transport element is formed as a pivotable lever.

5. The belt retractor of claim 1, wherein said transport locking element and said sensor blocking element are movable in directions perpendicular to each other.

6. The belt retractor of claim 1, wherein said springs are compression springs.

7. The belt retractor of claim 1, wherein said sensing element is formed integrally with said sensor blocking element.

8. The belt retractor of claim 1, wherein said sensor comprises an inertial mass which can be translated by mass inertia forces acting thereon from a neutral position into a trigger position, an intermediate element being provided which is entrained by said inertial mass once said inertial mass has executed a predetermined idle stroke from said neutral position toward said trigger position, said sensor blocking element blocking said intermediate element when said sensor blocking element is in said blocking position.

9. The belt retractor of claim 1, wherein said retaining section and said arresting section each comprises an inclined surface area oriented at an angle of approximately 45° to a direction of movement of said transport locking element and of said sensor blocking element, respectively.

10. The belt retractor of claim 1, wherein said transport locking element is movable into said release position by a screw for mounting said belt retractor in a vehicle.

11. The belt retractor of claim 1, wherein said spring biasing said sensor blocking element is dimensioned weaker than said spring biasing said transport locking element.

* * * * *